United States Patent
Atwood et al.

[11] 3,863,135
[45] Jan. 28, 1975

[54] REGULATED TRANSFORMERLESS POWER SUPPLY

[75] Inventors: Leon Warner Atwood, Vienna; Peruvemba Swaminatha Balasubramanian, Manassas, both of Va.; John Brian Gillett, Kingston, N.Y.

[73] Assignee: International Business Machines Corporation, Armonk, N.Y.

[22] Filed: July 16, 1973

[21] Appl. No.: 379,687

[52] U.S. Cl. .................................. 321/15, 307/110
[51] Int. Cl. .............................................. H02m 3/32
[58] Field of Search .......... 321/15, 2; 307/109, 110

[56] References Cited
UNITED STATES PATENTS

| | | | |
|---|---|---|---|
| 2,663,806 | 12/1953 | Darlington | 307/315 |
| 3,478,258 | 11/1969 | Nagai | 321/15 |
| 3,497,792 | 2/1970 | Mlynar | 321/15 |
| 3,505,586 | 9/1970 | Dulin | 321/15 |
| 3,543,130 | 11/1970 | Reijnders | 321/18 X |
| 3,602,795 | 8/1971 | Gunn | 321/15 |
| 3,621,362 | 11/1971 | Schwarz | 321/15 |
| 3,708,742 | 1/1973 | Gunn | 321/15 |

OTHER PUBLICATIONS

Nasa Facsimile Reproduction of N65-18948, Scientific & Technical Aerospace Reports, Issue No. 9, May 8, 1965, p. 8 (1930).
Electronics, "D-C Converter Circuit Uses Capacitor," March 21, 1966, pp. 97–98.

Primary Examiner—R. N. Envall, Jr.
Attorney, Agent, or Firm—Edward H. Duffield

[57] ABSTRACT

A transformerless direct current power supply having a regulated voltage output is disclosed. The supply uses cascaded sections of capacitive series voltage dividers in series to reduce and store full-wave recitifed DC input voltage which is then discharged in parallel at the desired output level. The charging and discharging of the cascaded capacitive series is regulated by a switching network driven by a feedback voltage derived from the output to regulate the charging of the capacitors in series and discharge of them in parallel.

3 Claims, 4 Drawing Figures

REGULATED TRANSFORMERLESS POWER SUPPLY

BACKGROUND OF THE INVENTION

This invention relates to direct current power supplies in general, and to regulated, transformerless, direct current power supplies in particular.

PRIOR ART

Previous inventors have made use of the voltage dividing characteristic of capacitors arranged and charged in series to provide a low voltage DC output from a higher voltage alternating DC input. Previous devices have also required numerous large capacitors, relative to the voltage and current levels being produced, in order to provide the reduced voltages. For example, a divide by 8 (or a provision of a seven-eighths reduction in voltage previously required 8 or $2^3$) rather large capacitors.

In light of these and other similar deficiencies in the prior art, it is an object of this invention to decrease the size of the capacitances required to improve a transformerless direct current power supply. It is further an object to improve such a power supply by decreasing the number of capacitors required to improve a transformerless direct current power supply. It is further an object to improve such a power supply by decreasing the number of capacitors required to achieve a given power of two voltage reduction. It is a further object of this invention to provide a regulated transformerless power supply of an improved type in which a plurality of output voltage levels may be simultaneously provided.

It is further an object to reduce voltage and power losses in a transformerless power supply in a new and improved fashion. And further, it is an object of this invention to provide an improved negative or positive voltage power supply using only NPN type devices so as to make easy fabrication of integrated circuits possible.

SUMMARY OF THE INVENTION

The foregoing and other objects of the invention are met by providing staged or cascaded divide-by-two capacitive series voltage step-downs. The intermediate switching levels are controlled by a feedback voltage which drives a pulse width modulation system at very high frequency so that the capacitance values required to pass a given amount of current are greatly reduced. Also, the use of staged divide-by-two voltage reductions makes possible a step-down by a factor of $2^n$ using only $2 \times n$ capacitors rather than the previously used $2^n$.

Rectified primary DC voltage at a high potential relative to the desired output potential is first connected in series through a controllable conduction switch to a capacitive divide-by-two network where the voltage is stored and is reduced by one-half. The provision of the switch provides the degree of isolation from injected pulse components being propagated further into this system and makes possible an easier control of the output voltage as will appear below. The output voltage at the divide-by-two network is then discharged in parallel through a second controlled conduction switch to still another series connected divide-by-two charge storage network which is isolated from the output by yet another controlled conduction switch. The output voltage, taken in parallel, is sensed and utilized as a comparison against a reference voltage to drive an astable multivibrator to control the switching stages interspersed between the primary supply and the output and the various divider stages so that power is cascaded in parallel from one dividing stage to the next, but charging is always in series and discharging is in parallel while each stage is always isolated from the primary supply by an open switch. Paired Darlington configuration transistors may be utilized to lower the breakdown voltage from that experienced with single transistors and to reduce current and voltage losses through the network.

The foregoing and other objects, features and advantages of the invention will be apparent from the following more particular description of a preferred embodiment of the invention, as illustrated in the accompanying drawings.

BRIEF DESCRIPTION OF THE DRAWINGS

Turning now to FIG. 1, a block diagram of the power supply scheme is shown. AC line voltage is rectified in a full-wave standard diode rectifier bridge 1 and applied across a capacitor, not illustrated in FIG. 1, to form an unregulated direct current supply at a full-wave rectified voltage of approximately one-half the AC line voltage supply. The rectified direct current is applied to a transistor switch 2 which may be alternately closed and opened using the output from an astable multivibrator 3 identified as A and NOT A (or $\overline{A}$) in the drawings. When switch 2 is closed, pulsating direct current is fed into the divide-by-two network 4 where the voltage is cut in half due to the fact that diodes used force charging in series of the capacitor used. From that point, the power is applied to another transistor switch 5, similarly under the control of the multivibrator 3. The output from the transistor switch 5 is applied to yet another divide-by-two network, 6 where, as illustrated in FIG. 1, the final output voltage is produced which is connected to the load 7 illustrated merely as a resistance. It is to be understood that numerous other divide-by-two stages (or other factors such as 3, etc.) and appropriate transistor switches could be chained together in this fashion to reduce the rectified voltage by factors of two each time, with one stage of reduction producing half voltage, two stages one-quarter voltage, three stages one-eighth voltage, four stages one-sixteenth voltage, etc.

Figure 1:
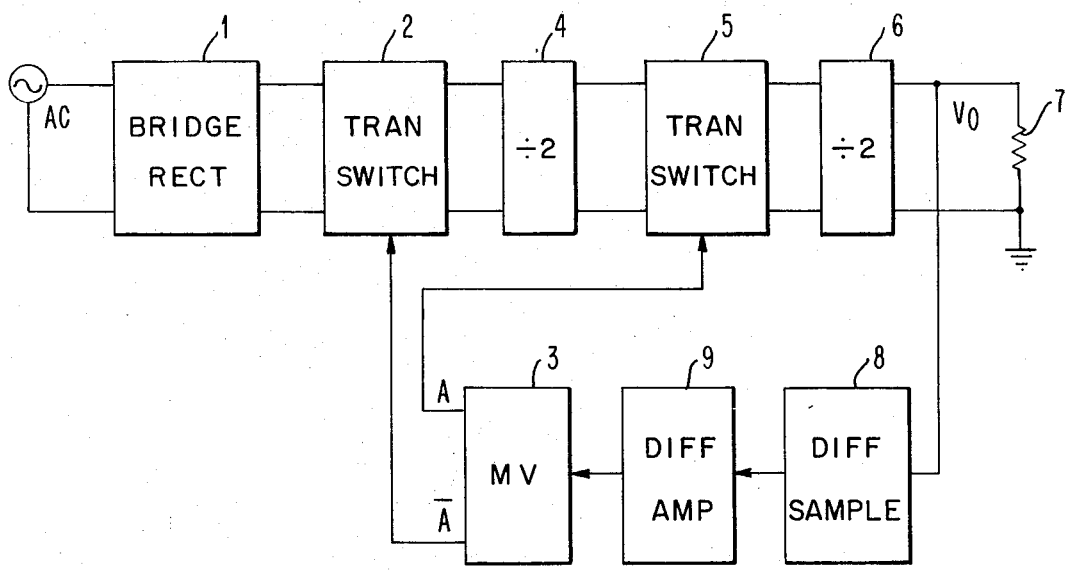
FIG. 1 illustrates in block schematic form the general structure and functional operation of the transformerless power supply system of the present invention.

In general, $2^N$ reduction requires N stages and $2 \times N$ capacitors, $3^N$ reduction required $3 \times N$, etc. The output voltage $V_o$ is sampled in a simple resistive or capacitive voltage pick-off 8 and the sample voltage sensed is then compared in a differential amplifier 9 with a reference voltage. The output from the differential amplifier 9 is used to gate the multivibrator 3 and control the switching of transistor switches 2 and 5, and for any other transistor switches that would be included in the more detailed embodiments possible. It can thus be seen that rectified voltage is first cascaded into a divide-by-two network which is isolated from a second divide-by-two network by a transistor switch which is in the opposite state to that transistor switch by which the power reaches the previous divide-by-two network. Therefore, a power supply line is never completed directly between the primary supply, or the bridge rectifier 1 in this case, and the output. Instead, the power is cascaded down a step at a time from one divide-by-two network to another under the control of the transistor switches placed between the dividing networks. The switches, in turn, are controlled by multivibrator 3 which is driven in response to the differential sensing function that determines whether the output voltage is above or below the desired reference point.

The differential amplifier utilized is a very sensitive one and will change over from indicating above reference voltage to below reference voltage with a very small change in the output. The multivibrator will be driven at a very high rate determined by the RC factors. Designs with operating frequencies on the order of 1MHZ have been implemented allowing the use of capacitances in the divide-by-two network which are relatively small compared to those previously used.

Figure 2:
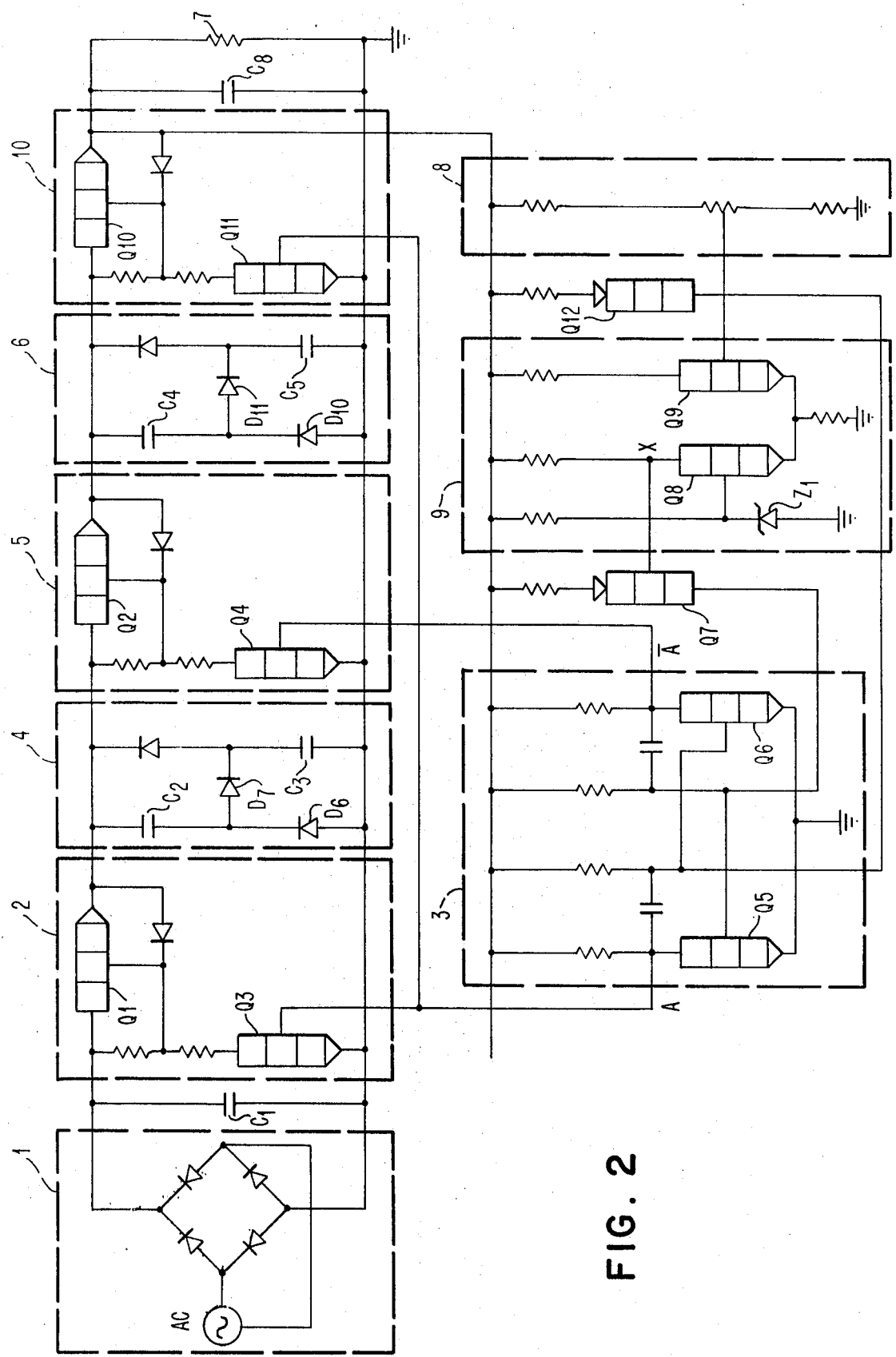
FIG. 2 illustrates in somewhat more detail an embodiment of the invention using single transistor switches of the NPN type.

FIG. 2 illustrates in somewhat more detail the schematic circuit which provides a divide-by-four overall voltage drop at the output. The major blocks outlined in dotted lines in FIG. 2 correspond to the numbers of FIG. 1, but an extra transistor switch 10 has been added to isolate the final divide-by-two network from the load. The capacitor $C_1$, which produces an unregulated DC supply at the output of the bridge rectifier 1, has also been shown.

The circuit in FIG. 2 operates as follows. AC line voltage applied at the input to the diode rectifier 1 is full-wave rectified and applied across capacitor $C_1$ to form the unregulated DC supply voltage as discussed previously. Switches Q1 (and simultaneously with Q1, Q10) and Q2 are alternately closed and opened, using the outputs A and $\bar{A}$ from the astable multivibrator 3, which in turn, is driven by the output from the differential amplifier 9 which compares the reference voltage generated by the Zener diode $Z_1$ with the output voltage sensed by the resistive sensor 8. When switch Q1 is closed, current flows through Q1 to charge capacitor $C_2$ and through diode $D_7$, with diode $D_6$ blocking, to charge capacitor $C_3$, charging these capacitors in series to a voltage equal to one-half that of the unregulated supply appearing across capacitor $C_1$. Switch Q1 is then opened, as will appear further in the discussion below, and Q2 is closed. When switch Q2 is closed, capacitor $C_2$ and $C_3$ discharge in parallel because of diode $D_7$ through switch Q2 to charge capacitor $C_4$ and, through diode $D_{11}$ with diode $D_{10}$ blocking, to charge capacitor $C_5$ in series to a voltage of one-fourth the supply voltage on $C_1$. The final output voltage, in parallel and under control of Q10, is sampled by a simple resistor divider network 8, but it could also be a capacitive device instead. This voltage is compared with a reference voltage in the differential amplifier 9. A signal is produced by differential amplifier 9 which is proportional to the difference between the output voltage sensed and the reference voltage. For example, if the output voltage goes below the reference voltage, the transistor Q8 will conduct and lower the potential of node X. This, in turn, will cause transistor Q7 to conduct much harder which will push more current into the base of transistor Q5, turning it on for an increased duration. When transistor Q5 is on, node A voltage will go down and this, in turn, will turn off transistor Q3 and turn on transistor Q1. This action will cause capacitor $C_2$ and $C_3$ to be charged to a higher level and this, in turn, will bring the output voltage up. The process is similar, but in reverse, when the output voltage goes above the reference voltage and causes $C_2$ and $C_3$ to be discharged to lower the voltage output.

As can be seen, transistors Q1 and Q10 are closed simultaneously whenever transistor Q2 is open. When Q10 closes, capacitor $C_4$ and $C_5$ discharge in parallel because of diode $D_{11}$ to capacitor $C_8$ which is a filter capacitor in the supply output, to charge capacitor $C_8$ to the voltage equal to one-fourth that of the unregulated DC supply. The advantage of using the feedback system illustrated is that energy fed into the system is automatically limited and controlled by changing the pulse width produced at the astable multivibrator 3.

Figure 3:
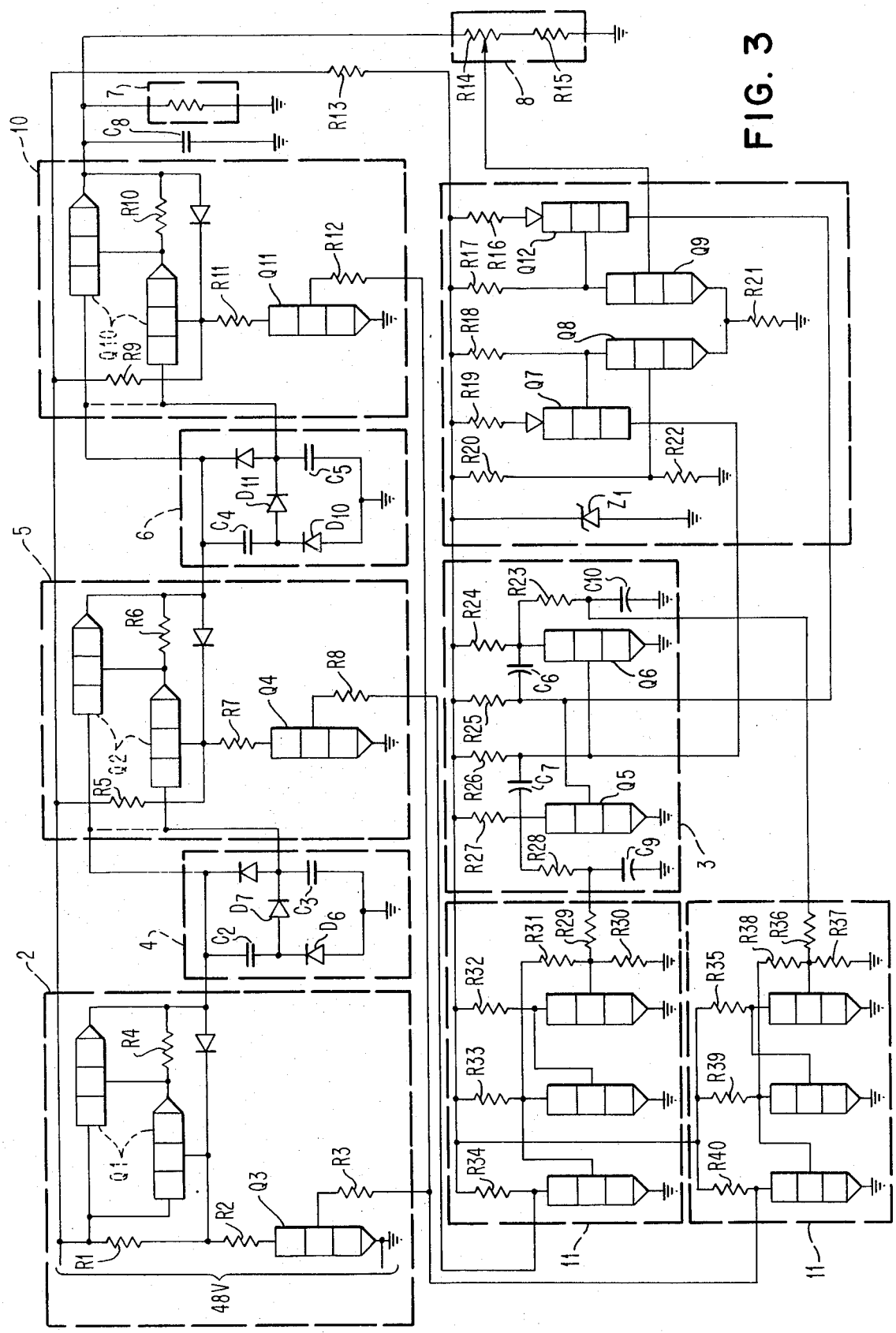
FIG. 3 is a schematic diagram showing a preferred embodiment of the circuit using primarily NPN transistors.

Turning now to FIG. 3, a preferred embodiment of the invention is illustrated. Switches Q1, Q2, and Q10 have been replaced by Darlington paired transistors and feedback driver amplifiers have been added at the output of the astable multivibrator. The illustration of the diode bridge 1 and the AC supply has been omitted as has the illustration of capacitor $C_1$ as it is understood that, in this example, the input to the circuit is 48 volts full-wave rectified DC as the unregulated output of the diode bridge and the capacitor $C_1$ of FIG. 2. The feedback driver amplifiers 11 provide further isolation between the output of astable multivibrator 3 and the inputs to the various switches 2, 5, and 10 and also assure complete saturation of the switches.

The Darlington pair of transistors for switch 2, which replaced transistor Q1 of FIG. 2, are shown in the normal configuration and this configuration is shown in dotted lines for switches 5 and 10 which have been modified somewhat to provide a different collector voltage point for the base driving transistors of the pairs. The modification in the Darlington pairs for switches 5 and 10 results in much lower loss as will be discussed below.

The diodes illustrated in the voltage dividers 4 and 6 and in the Darlington switches 2, 5, and 10 are Schottky diodes which have a lower loss characteristic as is well-known. However, ordinary diodes can also be utilized without a large sacrifice in power loss. The functioning of the circuit in FIG. 3 is the same as that illustrated in FIG. 2 and discussed relative thereto, thus, further discussion of the operation of the preferred embodiment of FIG. 3 will be omitted. The operation of the amplifiers 11 illustrated in FIG. 3 is clear from the circuit diagram and needs no further discussion.

In the power supply design, the most significant power losses usually occur in the series switches in the two-transistor Darlington pairs. The advantage of the Darlington configuration is that a high gain is derived at the expense of a high unsaturated collector-to-emitter voltage which produces an associated high power loss due to the drop across the transistor. This voltage is equal to the drop between the base and emitter plus the drop between the collector and the emitter at saturation. If the unsaturated condition of one of the two transistors giving the high gain can be maintained while at the same time achieving a lower collector to emitter voltage without adding other power dissipating devices, improved efficiency and reduced power loss can result. One way of accomplishing this without adding any devices, except for the first switch 2 of FIG. 2 and 3, is illustrated in FIG. 3 for switches 5 and 10.

In FIG. 3, the collectors for the base driving transistors of the Darlington pairs are connected to different nodes than they would be connected to in the ordinary configuration illustrated for switch 2. The collectors for these transistors are connected to a higher voltage supply by connecting them before the diode in the collector circuit for the main switching transistor. In this way, the voltage between the collector and base of the main power handling transistor is determined by the difference in drop between the diode and the saturated driving transistor of the pair. This difference will normally be on the order of 0.4 to 0.6 volts and the main power handling transistor will be held out of its saturation condition while its high gain is preserved. This is the case where the diode used is an ordinary one. If a Schottky diode is utilized, the drop will be no greater than 0.1 to 0.2 volts which will enhance the efficiency still further. The reduction in power dissipation in the series switches 5 and 10 will be considerable because the drop in the the voltage between the collector and emitter will be in the range of 40 to 50%.

The first stage switch 2 does not lend itself to this solution as the necessary extra diode is not provided in the circuit and would have to be added as an additional element. However, the switch in the first stage is the one with the least power loss, so the penalty of leaving this condition uncorrected is minimal.

Figure 4:
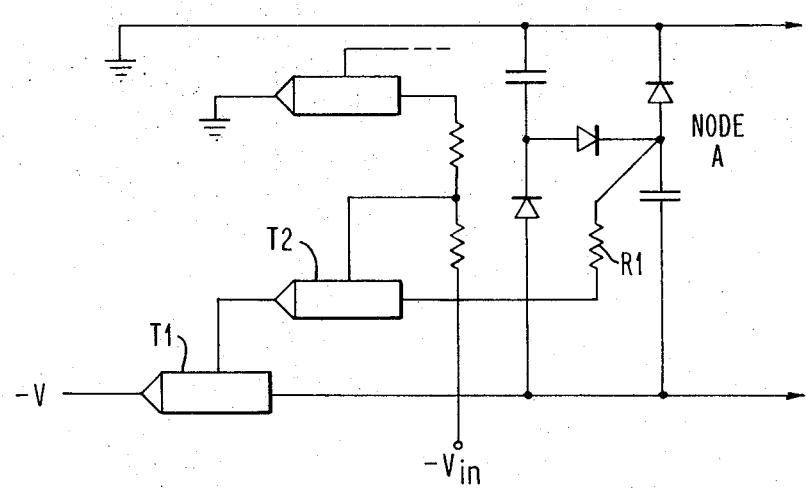
FIG. 4 illustrates a modification by which the circuit, by using NPN transistors, can be made to produce a negative power supply.

Negative voltage power supplies can also be constructed utilizing the technique of the present invention and FIG. 4 illustrates one stage in such a design. In FIG. 4, the solution to the power loss problem applies to all stages including the equivalent of switch 2, provided a resistive or capacitive voltage divider is added to the output stage to supply a voltage corresponding to that in node A and all other stages. A difference here is that T1 saturates, which reduces the power dissipation still further. However, part of this reduction in loss must be sacrificed due to the requirement for a large base drive current which results as a consequence of the decreased gain. This is in turn partially compensated by the availability of a base drive voltage in node A which is less than half the input voltage to each stage. The drop and power dissipation in $R_1$ is reduced by more than one-half as a result of this. If it is desired to reduce the dissipation in the drive circuit for T2, T2 may be replaced by a Darlington configuration itself.

ADVANTAGES

It is quite apparent from FIGS. 2 and 3 that additional stages of switches and voltage dividers can be utilized to reduce the voltage to any desired level and that, similarly, although divide-by-two dividers have been illustrated, divide by N capability is equally possible and, in general, any degree of division can be obtained by using unequal stages in the divide voltage networks and by chaining them together in cascade as taught. For example, a divide-by-three network can be chained with a divide-by-two network to give a one-sixth voltage output, etc.

In addition, the voltage level of the output need not be taken off the final switch and divider stage as shown but may be taken from an intermediate point at the output of one of the earlier stages so that a single power supply constructed as shown can be utilized, with appropriate feedback circuits as shown, to provide regulated power output at a variety of levels utilizing the same circuit.

The following table gives typical parameter values that may be employed for the various elements in FIG. 3 to produce an approximate output level of 5 volts at 25 watts, Direct Current.

| Element | Value | Element | Value |
|---|---|---|---|
| $C_2$ | 4μf | $R_{21}$ | 2.4KΩ 1/8w |
| $C_3$ | 4μf | $R_{22}$ | 3.0KΩ 1/8w |
| $C_4$ | 15μf | $R_{23}$ | 500Ω 1/8w |
| $C_5$ | 15μf | $R_{24}$ | 20KΩ 1/8w |
| $C_8$ | 50μf | $R_{25}$ | 1KΩ 1/8w |
| $C_9$ | 330pf | $R_{26}$ | 20KΩ 1/8w |
| $C_{10}$ | 330pf | $R_{27}$ | 1KΩ 1/8w |
| $R_1$ | 1KΩ 1w | $R_{28}$ | 500Ω 1/8w |
| $R_2$ | 500Ω 1w | $R_{29}$ | 2.7KΩ 1/8w |
| $R_3$ | 100Ω 1/2w | $R_{30}$ | 1.5KΩ 1/8w |
| $R_4$ | 150Ω 1/2w | $R_{31}$ | 10.0KΩ 1/8w |
| $R_5$ | 1KΩ 1w | $R_{32}$ | 5.0KΩ 1/8w |
| $R_6$ | 80Ω 1/8w | $R_{33}$ | 1.6KΩ 1/8w |
| $R_7$ | 200Ω 1w | $R_{34}$ | 1KΩ 1/8w |
| $R_8$ | 200Ω 1/8w | $R_{35}$ | 5.0KΩ 1/8w |
| $R_9$ | 1KΩ 1w | $R_{36}$ | 2.7KΩ 1/8w |
| $R_{10}$ | 40Ω 1/8w | $R_{37}$ | 1.5KΩ 1/8w |
| $R_{11}$ | 100Ω 1w | $R_{38}$ | 10.0KΩ 1/8w |
| $R_{12}$ | 100Ω 1/8w | $R_{39}$ | 1.6KΩ 1/8w |
| $R_{13}$ | 1.5KΩ 1w | $R_{40}$ | 1KΩ 1/8w |
| $R_{14}$ | 100KΩ 1/2w | | |
| $R_{15}$ | 3.0KΩ 1/8w | | |
| $R_{16}$ | 10.0KΩ 1/8w | | |
| $R_{17}$ | 1.5KΩ 1/8w | | |
| $R_{18}$ | 1.5KΩ 1/8w | | |
| $R_{19}$ | 10.0KΩ 1/8w | | |
| $R_{20}$ | 3.0KΩ 1/8w | | |
| $C_6$ | 50pf | | |
| $C_7$ | 50pf | | |

While the invention has been particularly shown and described with reference to a preferred embodiment thereof, it will be understood by those skilled in the art that various changes in form and details may be made therein without departing from the spirit and scope of the invention.

What is claimed is:

1. A method for converting direct current power at an input voltage level to a lower controlled output voltage level at a load, comprising the steps of:

switching said input voltage through a first switch of M controllable conductance switches to the first capacitive series voltage divider of a series of N capacitive series voltage dividers, said dividers being connected together from the divided voltage output of one of said dividers to the input of the next of said dividers in said series by similar such controllable conductance switches, and simultaneously switching said divided voltage outputs of the even numbered ones of said N dividers, where N is any whole number, to the next connected element by actuating the odd numbered ones of said M switches where M equals N+1;

storing and reducing the voltage of an electrical charge in N capacitive series voltage dividers connected in said series via controllable conductance switches by operating said odd numbered switches to charge said series connected capacitive voltage dividers with power from the element next previous in the series with the last such switches connecting the Nth divider to a load;

controlling the switching of said controllable conductance switches by a signal from a mutually exclusive switching control which operates all of said odd numbered switches simultaneously and all of said even numbered switches simultaneously, but at alternate times to insure that all of said even numbered switches are in opposed conductive condition to said odd numbered switches at all times;

sensing the output voltage at the output of said Nth divider connected via said Mth controllable conductance switch to said load;

comparing said output voltage with a desired reference voltage and generating a control signal proportional to the difference therebetween; and operating said mutually exclusive switching control in response to said control signal thereby providing a pulse width modulated control of said storing and reducing steps to regulate said output voltage.

2. A power conversion circuit for converting direct current power at a higher source input voltage level to direct current power at a lower controlled output voltage level, comprising input terminals adapted to receive power from a full-wave rectified source and output terminals adapted to deliver said power at a lower controlled output voltage to a load; and further comprising:

charge storage and voltage reduction means for storing and reducing voltage comprising at least one stage of series connected capacitors;

input switching means of controllable conductance for controllably coupling said charge storage and voltage reducing means in series with said input terminals;

output switching means of controllable conductance for controllably connecting said stage of charge storage and voltage reduction means in parallel with said output terminals;

control means for alternately switching said input switching means and said output switching means in opposite conductive condition to one another, respectively; and means for sensing the voltage level at said output terminals;

means for comparing said output voltage with a desired voltage level; and means responsive to the difference between said voltage levels resulting in said comparison step for operating said control means in a pulse width modulation mode, thereby controlling the amount of charge and the voltage delivered at said output terminals; and having a plurality of said charge storage and voltage reducing stages, each having the same voltage division capability and, after said at least one stage, being connectable from the reduced voltage output of one to the input of another by controllable conductance switches controlled by said control means to achieve an output voltage reduction of the function $X^n$ where n is the last said stage number and is any whole integer and X is any whole number divisor embodied in said voltage reducing stages as desired.

3. A power conversion circuit as described in claim 2, further comprising:

means for providing an output voltage at each said stage.

* * * * *